UNITED STATES PATENT OFFICE.

GEORGE HALE BRABROOK, OF TAUNTON, MASSACHUSETTS.

ASBESTOS MOLD.

972,990.  Specification of Letters Patent.  Patented Oct. 18, 1910.

No Drawing.  Application filed July 14, 1905. Serial No. 269,723.

*To all whom it may concern:*

Be it known that I, GEORGE HALE BRABROOK, a citizen of the United States, residing at Taunton, county of Bristol, State of Massachusetts, have invented a certain new and useful Improvement in Asbestos Molds, of which the following is a specification.

My invention has for its object to provide a mold for the manufacture of castings, and particularly for the manufacture of castings of a delicate nature having fine lines and ornamentation upon their surfaces.

The invention will be fully understood from the following description, and the novel features thereof will be pointed out and clearly defined in the claims at the close of this specification.

Molds embodying my invention may be made in the following manner: I preferably take a number of moist sheets of asbestos paper which may be the ordinary asbestos paper of commerce, and which I believe to be made from asbestos fiber held together with sizing or paste or other suitable binding material, and having also possibly a filling of clay or similar material. I paste the proper number of these moist sheets together until a mass of the desired thickness is obtained. The moist asbestos mass thus formed may be then placed upon the pattern and rammed or packed into the interstices of the said pattern with a stereotyper's brush or similar tool, or in any other convenient manner, until a perfect mold is obtained, after which the mold is removed from the pattern; or, if more convenient, may be partially dried upon the pattern, under pressure. I then apply to the surface of the mold a facing material of some suitable kind and replace the mold upon the pattern and ram it again, thereby causing the facing material to take the impression of the pattern so that the mold is left with a smooth almost polished surface which is free from disturbed fibers and unevennesses. If more convenient the facing material may be applied to the asbestos mass before the same is placed upon the pattern and rammed. In practice I find it best to use facing material in the manner described in my application for process of molding, filed November 9, 1904, Serial No. 232,059. In the process there described, I apply a facing composed of some suitable incombustible and non-fusible facing material, such as German or French burnt sand in the form of an impalpable powder, and capable of withstanding a high degree of heat, mixed with a volatile liquid hydro-carbon (preferably benzene non-mixable with water. The said facing material and volatile liquid are preferably mixed together in the proportions of one third of a pint of the facing material to one pint of the liquid, and this mixture is then sprayed or otherwise applied to the surface of the asbestos in a thin pasty or semi-plastic condition, so as to fill the interstices in the surface of the mold and form a skin or layer on said surface. The benzene may be modified to cause it to evaporate more slowly, or it may be, if desired, rendered non-inflammable by the admixture of a proper proportion of tetrachlorid of carbon. After the facing material has been applied to the asbestos mass the said mass is placed upon the pattern and rammed, after which the asbestos mold thus obtained is dried or baked.

In the case of very deep ornamentation, the following method of applying the facing material may be employed: First face the asbestos, then ram on pattern; and should the high and deep points break through the facing a further application of the facing material may be applied and another ramming on the pattern effected.

Instead of using sheets of asbestos paper to build up a layer or mass of sufficient thickness I may employ asbestos fiber, forming it into a moist mass or pulp with water and paste, and may apply this mass to the pattern under pressure.

I am aware that it has been hitherto proposed to face asbestos stereotype matrices with plant glue. Such a mold will not however answer the purposes for which my mold is intended since the facing would not withstand any considerable degree of heat and would therefore be wholly unfit for the casting of metals commonly employed in the production of high grade castings having fine ornamentation thereon. I employ a powdered facing material characterized generally as infusible and incombustible. I do not however wish to limit myself to the use of any particular infusible and incombustible powdered facing material since I believe myself to be the first person to face an asbestos mold with a powdered facing material.

What I claim is:

1. A mold for producing metal castings consisting of compressed asbestos, and provided with an inside facing of finely powdered material other than asbestos, said facing being compressed into the inside face of the mold.

2. A mold for metal castings formed of asbestos provided with a facing to receive the molten metal, said facing consisting of material other than asbestos and mixed with a volatile liquid non-mixable with water, said facing being capable of receiving an impression from a pattern and also capable of withstanding a high degree of heat.

3. A mold for metal castings formed of compressed asbestos provided with a facing of suitable material compressed into the face of the asbestos mold.

4. A mold for metal castings formed of compressed sheets of asbestos shaped to the form of the article to be cast and provided with a facing of suitable material mixed with a volatile liquid non-mixable with water.

5. A mold for metal castings formed of compressed asbestos shaped to the form of the article to be cast and provided with a facing of suitable material compressed into the inner face of the asbestos material.

In testimony whereof I affix my signature, in presence of two witnesses.

GEORGE HALE BRABROOK.

Witnesses:
WM. A. MACLEOD,
ALICE H. MORRISON.